(12) United States Patent
Gassmann et al.

(10) Patent No.: US 11,846,293 B2
(45) Date of Patent: Dec. 19, 2023

(54) METHOD FOR OPERATING A PUMP

(71) Applicant: Sulzer Management AG, Winterthur (CH)

(72) Inventors: Simon Gassmann, Zürich (CH); Thomas Felix, Leeds (GB); Karel De Raeve, Winterthur (CH)

(73) Assignee: SULZER MANAGEMENT AG, Winterthur (CH)

( * ) Notice: Subject to any disclaimer, the term of this patent is extended or adjusted under 35 U.S.C. 154(b) by 93 days.

(21) Appl. No.: 17/099,987

(22) Filed: Nov. 17, 2020

(65) Prior Publication Data
US 2021/0164481 A1 Jun. 3, 2021

(30) Foreign Application Priority Data
Dec. 2, 2019 (EP) .................................. 19212998

(51) Int. Cl.
*F04D 27/00* (2006.01)
*F04D 31/00* (2006.01)
*F04D 27/02* (2006.01)

(52) U.S. Cl.
CPC ....... *F04D 27/001* (2013.01); *F04D 27/0223* (2013.01); *F04D 31/00* (2013.01)

(58) Field of Classification Search
CPC .... F04D 25/0686; F04D 27/001; F04D 31/00; F04D 27/02–0223; F04D 27/0246–0261; F04D 27/0276; F04D 29/66; F04D 29/668
See application file for complete search history.

(56) References Cited

U.S. PATENT DOCUMENTS

| | | | |
|---|---|---|---|
| 3,424,370 A | 1/1969 | Law | |
| 4,399,548 A * | 8/1983 | Castleberry | F04C 28/28 377/16 |
| 4,594,051 A * | 6/1986 | Gaston | G05D 23/22 415/48 |
| 9,328,949 B2 * | 5/2016 | Blaiklock | F04D 27/0261 |

(Continued)

FOREIGN PATENT DOCUMENTS

GB 2298239 A 8/1996

OTHER PUBLICATIONS

Extended European Search Report dated May 18, 2020 in corresponding European Patent Application No. 19212998.9, filed Dec. 2, 2019.

*Primary Examiner* — Alexander B Comley
(74) *Attorney, Agent, or Firm* — GLOBAL IP COUNSELORS, LLP (57) ABSTRACT

A method for operating a pump, for conveying a fluid from a low-pressure side to a high-pressure side of the pump includes determining a current rate of change of pump vibrations and comparing the current rate of change with a limit for the rate of change or determining a current vibration of the pump and comparing the current vibration with a vibration amplitude limit for the vibration, storing the limit for the rate of change or the vibration amplitude limit in a surge controller, providing a control signal when the current rate of change reaches the limit or when the current vibration reaches the vibration amplitude limit, and changing a control variable of the pump by the control signal, such that the vibration is reduced and an unstable operating state of the pump is avoided.

18 Claims, 5 Drawing Sheets

(56) References Cited

U.S. PATENT DOCUMENTS

| | | | |
|---|---|---|---|
| 2010/0296914 A1* | 11/2010 | Staroselsky | F04D 27/001 415/47 |
| 2013/0170952 A1* | 7/2013 | Brenne | F04D 27/0223 415/49 |
| 2016/0177958 A1* | 6/2016 | Schneider | F04D 27/001 415/36 |
| 2017/0002820 A1* | 1/2017 | Benim | F04D 27/02 |
| 2017/0218968 A1* | 8/2017 | Johnsen | F04D 27/0223 |
| 2017/0260982 A1* | 9/2017 | Grøtterud | F04D 27/0215 |
| 2018/0258940 A1 | 9/2018 | Chambhare | |
| 2019/0301477 A1* | 10/2019 | Pelella | F04D 27/001 |

* cited by examiner

METHOD FOR OPERATING A PUMP

CROSS-REFERENCE TO RELATED APPLICATION

This application claims priority to European Patent Application No. 19212998.9, filed Dec. 2, 2019, the contents of which are hereby incorporated herein by reference in their entirety.

BACKGROUND

Field of the Invention

The invention relates to a method for operating a pump, in particular a multiphase pump, and to a pump, in particular a multiphase pump, for conveying a fluid.

Background Information

Conventional multiphase pumps are pumps with which fluids can be conveyed which comprise a mixture of a plurality of phases, for example a liquid phase and a gaseous phase. Such pumps have been well known for a long time and are produced in a large number of embodiments, frequently as centrifugal pumps, for example as helico-axial single-stage or multi-stage pumps. The field of application of these pumps is very wide; they are used, for example, in the oil and gas industry to convey mixtures of petroleum and natural gas and specifically as pressure-elevating pumps which are also called booster pumps.

It is a known technology to increase or extend the utilization or the exploitation of oil fields using such booster pumps. In particular when the naturally present pressure in an oil field decreases as the oil production increases, the pressure exerted on the borehole is reduced by a booster pump due to the conveying of the pump so that the oil can continue to flow out of the borehole.

These pressure-elevating pumps frequently have to generate high pressures because the boreholes are very deep or are difficult to access so that very long lines or pipelines are required between the borehole and the processing or storage devices. This in particular also applies with sub-sea applications when, for example, the outlet of the borehole is on the seabed and the processing or storage equipment is provided on land, on a drilling platform or on a ship as an FPSO (floating production storage and offloading unit). It is necessary for a booster pump to pump over large geodetic heights and to be able to generate a correspondingly high pressure.

SUMMARY

The efficiency and the performance capability of a multiphase pump depends to a very high degree on the current phase composition or phase distribution of the multiphase fluid to be conveyed. The relative volume portions of the liquid phase and of the gaseous phase—for example in oil production—are subject to very large fluctuations, which is due to the natural source, on the one hand, but is also caused by the connection lines, on the other hand. There are several effects here by which the liquid phase can collect in certain regions until the line cross-section is completely filled with the liquid phase and a pressure increase in the gaseous phase arises upstream to a point where the pressure becomes so great that the liquid phase is abruptly expelled. Other interactions between the gaseous phase and the liquid phase can also result in pressure pulsations in the line. The fluctuations in the phase distribution of the multiphase fluid are thus also caused by the architecture and the dynamics of the line system.

Such effects can cause the multiphase pump to enter into an unstable operating state, which is also called a surge or surging, due to too low a flow rate. Such unstable operating states are characterized by extremely fluctuating flow rates, pressure shocks, large performance and pressure fluctuations as well as strong vibrations of the pump. Such unstable operating states represent an extremely great load on the pump itself and on the adjacent installations. If a multiphase pump is operated for too long in such an unstable operating state, this can result in premature material fatigue, much higher wear, defects, up to the failure of the complete pump, whereby disadvantageous effects on the installations provided downstream of the pump result. The failure of the multiphase pump can even lead to the total production process being interrupted, which is naturally very disadvantageous from an economic standpoint.

To remedy or at least to attenuate the problems resulting from variations in the phase distribution, it is known to provide a buffer tank upstream of the multiphase pump whose volume and inner design is adapted to the respective application. This buffer tank acts so-to-say as a filter or as an integrator and can thus absorb or damp sudden changes in the phase distribution of the fluid so that they cannot enter into the inlet of the multiphase pump or only in very weakened form.

However, since such buffer tanks cannot be designed with any desired size and since they can also not damp out all variations of the phase distribution, a security against underflow, or a surge regulator, is frequently provided with a multiphase pump. This is typically also called a surge control or surge protection and is intended to prevent the multiphase pump from entering into such an unstable operating state. It is a known measure for the surge control or regulation to provide a return line through which the fluid conveyed by the multiphase pump can be led back from the pressure side of the pump to the intake side. One or also more control valves, for example two control valves, are provided in this return line and can be controlled by the surge regulator and accordingly allow a smaller or larger flow through the return line. If, for example, two control valves are provided, one is frequently built as a fast acting on/off valve (fully open or fully closed) while the other is built as a (relatively slow acting) choke valve with many different opening steps. The logic of the surge regulator is usually integrated in the control device of the pump which is nowadays as a rule designed as a digital control system.

If very high proportions of gas are present in the multiphase fluid to be pumped, then a cooling system can in particular also be provided in the return line to avoid too great a thermal load or heat build-up.

In certain cases, a flowmeter is furthermore provided either at the inlet or at the outlet of the multiphase pump.

A minimum relative flow (q*min, flow relative to best efficiency point at a given speed) is typically stored in the corresponding control unit for the surge regulator. When the q*min is reached, countermeasures have to be initiated. The relative flow limit is fixed on the basis of a surge limit which indicates the parameter constellations at which the transition into an unstable operating state takes place. This surge limit is determined on the basis of empirical values and/or on the basis of experimentally determined data. The limit curve is then fixed at a certain "safety margin" from the surge limit to avoid unstable operating states during the operation of the pump. If the pump reaches the limit curve during operation, then the surge regulator controls the control valve or control valves such that the backflow in the return line is increased and the pump moves away from the limit curve again.

Surge regulators or securities against underflow known today require knowledge of the current (actual) flow rate, of the current (actual) phase distribution of the conveyed multiphase fluid and the current (actual) rotational speed of the pump. A direct measurement of the flow rate and of the actual phase distribution using a single instrument or sensor is, however, not possible because such measurement instruments are not available. The flowmeter must therefore be designed as a multiphase flowmeter. The multiphase flowmeter determines the flow rate on the basis of a simultaneous technical measurement of directly accessible process values such as the absolute pressure, differential pressure, density and temperature, which are then processed in a semi-empirical model to determine or estimate the actual flow rate and the actual phase distribution of the fluid in the multiphase flowmeter.

Such multiphase flowmeters are complicated and complex pieces of apparatus. The different sensors in a multiphase flowmeter for measuring the different process parameters have very large variations with respect to the update rate of the respectively determined process parameter. The sensor with the smallest update rate then naturally determines the maximum possible update rate of the multiphase flowmeter. This maximum update rate is sometimes not sufficient to ensure a reliable surge control or a reliable security against underflow. For sub-sea installations and the associated maritime environment in particular, the corresponding pieces of apparatus have even smaller update rates, which further reduces the dynamic performance capability of the surge regulator. Since greater safety margins from the limit curve are thus necessary to avoid unstable operating states, the operating range of the multiphase pump is further restricted.

Problems can also occur with single-phase pumps, that is with pumps which serve for the conveying of a single-phase fluid, for example a liquid. It is here also frequently necessary or desired to provide minimum flow regulators or securities against underflow for the pump. Minimum flow regulators known today typically use signals from flowmeters which measure the throughflow of the fluid in a correspondingly similar way as described above with reference to the multiphase flowmeters. Similar problems as described further above also result with these flowmeters, namely they can in particular frequently not be positioned at the desired point, or only with a great effort, and their update rates are frequently too small or the delays in the signal transmission are too large so that the minimum flow regulator has to be designed with very large safety margins. The operating range in which the pump can be safely operated is thereby restricted.

Optionally, the torque can be used instead of the signal from the flowmeter as a basis to provide protection from surge. Thereby, the return line can be opened, or the pump can be tripped when operating state approaches the limit curve. To predict the limit curve over the entire life of field with varying fluid viscosities and GVFs (GVF: gas volume fraction) is very hard, since the limit curve is predefined on the basis of empirical values and/or on the basis of experimentally determined data, which only represent limited data sets for practical and economic reasons. Measuring the required parameters in the field with sufficient accuracy and/or sampling time is also very challenging. Therefore, the defined limit curve is fixed at a "safety margin" from the surge limit, accounting for uncertainty in the data.

Starting from this prior art, it is therefore an objective of the invention to propose an operating method for a pump, in particular for a multiphase pump, and a corresponding pump, in particular a multiphase pump, in which a reliable surge control or a reliable security against underflow is realized in a simple manner which is in particular not reliant on complicated multiphase flowmeters and in which a larger operational pump envelope can be realized.

The subjects of the invention satisfying this object are characterized by the features described herein.

In accordance with an embodiment of the invention a method for operating a pump, in particular for operating a multiphase pump, for conveying a fluid from a low-pressure side to a high-pressure side of the pump is proposed, in which method a pump vibration changes with a rate of change and a current rate of change of the pump vibration is determined and is compared with a limit for the rate of change and/or a current vibration of the pump is determined and is compared with a vibration amplitude limit for the vibration. The limit and/or the vibration amplitude limit is stored in a surge control unit, and a control signal is provided when the current rate of change reaches the limit and/or when a current vibration reaches the vibration amplitude limit. A control variable of the pump is changed by the control signal, such that the vibration is reduced and thus an unstable operating state of the pump is avoided.

In the scope of the invention the vibration refers to an amplitude of the vibration and the rate of change of the vibration refers to a change of the amplitude of the vibration. In a normal operating state there are only little changes in the amplitude of the vibration. If there is a sudden increase in the amplitude, the limit and/or the vibration amplitude limit may be exceeded, since a sudden increase in the amplitude also results in a sudden increase in the rate of change of the amplitude. The limit does not depend on an absolute value of the vibration (i.e. an absolute value of the amplitude of the vibration), but on the delta in the amplitude (i.e. the rate of change) of the vibration. Hence, the control action reduces the amplitude of the vibration in order to avoid the unstable operating state of the pump.

Preferably, the rate of change or the current rate of change of the pump vibration is a first rate of change or a first current rate of change of the pump vibration in a predetermined spatial direction. The pump vibration can therefore correspond to a mode in one of the three spatial directions or to a vibration composed of the modes of the three spatial directions. Furthermore, the pump vibration can be a longitudinal and/or transverse pump vibration. In some applications it is preferable that the rate of change of the vibration (i.e. the increase in the amplitude of the vibration) is used. For these applications, the absolute value of the vibration is of minor importance. The vibration of the pump can also be understood as an oscillation of the pump. The vibration can be measured, for example, at the shaft by use of proximity probes, in a bearing or on a housing of the pump by use of accelerometers.

The vibration can therefore be measured with an acceleration or a distance sensor in order to determine the rate of change. These sensors can be arranged at the housing of the pump or at the bearing of the pump. The sensors can be arranged at a suction side and/or discharge side of the pump at a radial bearing. In a preferred embodiment the sensor is arranged at the suction side at the radial bearing.

In an advantageous embodiment of the method according to the invention, the control signal is provided when the current rate of change reaches and/or exceeds the limit and a timer for at least a predetermined period of time has elapsed and the vibration stays at or above a certain vibration level for the predetermined period of time of the timer.

As a preferred measure an operating limit for an operating parameter of the pump below which the pump can still be reliably operated in a stable operating state can be stored in the surge control unit in addition to the vibration rate of change limit and/or the vibration amplitude limit. The control signal is provided when a current value of the operating parameter reaches the operating limit and the current rate of vibration change reaches the limit or the vibration (the amplitude of the vibration) reaches the vibration amplitude limit. If the limit and/or the vibration amplitude limit is reached (or exceeded) after the operating limit has been reached, this may indicate that the pump is about to enter the unstable operating state. However, since the operating limit is usually determined with approximate values, greater safety margins from the operating limit are thus necessary to avoid unstable operating states. In order to reduce these safety margins and therefore enlarge an operational range of the pump, the operating limit can be used as an indicator that the pump is about to enter the unstable operating state. Therefore, the pump can continue to be operated without triggering the control signal until the current rate of change of the vibration reaches the limit.

The term "operating parameter" means those parameters which determine an operation of the pump and which can be set by a monitoring or control device of the pump, that is, for example, a flow rate of the pump, a rotating speed of the pump, its power consumption, a torque at which the pump is driven, etc. In the sense of this application, such operating parameters are in particular not those which are predefined by the fluid itself, such as the phase distribution of the fluid (in the case of a multiphase fluid) or its viscosity, since these values cannot be input or set at the pump itself.

Since the surge control unit uses the rate of change of the pump vibration and/or the vibration in combination with the operating parameter for avoiding the unstable operating state, it is not necessary to estimate or determine values which can only be detected with great difficulty and nevertheless ensure a reliable and stable surge regulation or security against underflow of the pump, in particular of the multiphase pump.

Using the rate of change of the pump vibration or the vibration in conjunction with operating parameter reduces a required accuracy and the safety margins. Therefore, the safety margin from the unstable operating states can be reduced or can be minimized so that the pump can be operated in a larger operating range.

The operating limit can indicate a unique relationship between the operating parameter and a pressure difference generated by the pump, in particular by the multiphase pump, because the pressure difference can be determined very simple or can be detected by measurement. The pressure difference is preferably detected by measuring a pressure at an inlet and a pressure at an outlet of the pump to compare the current value of the operating parameter with the operating limit.

It has proven to be advantageous in practice if the operating parameter used by the surge control unit is in a unique relationship with the torque with which the pump is driven.

In accordance with a preferred embodiment the operating parameter is a torque with which the pump is driven. The current value of the operating parameter, such as the current value of the torque can be provided by a variable frequency drive for the pump. A dependence of the current value of the torque on the pressure difference generated by the pump allows the fixing of the operating limit which can in combination with the vibration rate of change limit and/or the vibration amplitude limit reliably prevent the pump from entering into the unstable operating state. The variable frequency drive can also control for example a rotational speed of the pump as control variable.

In accordance with another preferred embodiment, the operating parameter is the flow rate, which can for example be determined by a multiphase flow meter. A dependence of the current value of the flow on the pressure difference generated by the pump allows the fixing of the operating limit which can in combination with the vibration rate of change limit and/or the vibration amplitude limit reliably prevent the pump from entering into the unstable operating state.

The surge control unit is preferably integrated into the control device for the control of the pump in order to minimize the cost and complexity.

A preferred measure is for the operating limit to indicate the dependence of the torque on the pressure difference at which the pump is still reliably operated in a stable operating state. This means that the operating limit is preferably fixed such that it does not run exactly where the transition of the pump into an unstable operating state takes place, but rather that a safety reserve is provided. If such a fixed torque limit is used, a lot of operating envelope is lost. This is because the torque is not only depending on the pressure difference but also on the gas volume fraction and on the fluid viscosity. Therefore, it is advantageous if the operating limit is fixed at a spacing from a lower surge limit line, wherein the lower surge limit line indicates the respective value of the operating parameter at which the pump moves into the unstable operating state. In an advantageous embodiment the vibration can first be measured after the operating limit has been reached, to create a cascade to detect the unstable operating state, such that the pump can continue to be operated without triggering the control signal until the current rate of change of the vibration reaches the limit.

The operating limit can be determined with the aid of experimental test data for the determination of which the pump is brought into the unstable operating state. Also, the lower surge limit line is preferably determined with the aid of experimental test data for whose determination the pump is led into an unstable operating state. This can take place, for example, in a test stand before taking the pump into operation, where the pump is then deliberately brought into an unstable operating state (surging) in order thus to determine at which values of the operating parameter and/or rate of change of vibration this transition takes place. It can naturally also be advantageous if empirical values are used for determining the lower surge limit line. Time can hereby be saved by reducing the experimental effort to determine the lower surge limit line for the respective pump.

In accordance with a preferred embodiment the pump can comprise a return line for returning the fluid from the high pressure side to the low pressure side. A position of a control valve in the return line is controlled as the control variable, wherein the position of the control valve controls a flow through the return line. Additionally, the control variable can be a speed of the pump which might be changed to avoid the unstable operating state. Furthermore, the control variable can be a switch to turn of the pump, such that the pump is tripped when the vibration rate of change limit and/or the vibration amplitude limit is reached or the vibration rate of change limit and/or the vibration amplitude limit and the operating limit is reached. In particular, the pump can be tripped by the switch if the pump is still surging after controlling the return line and/or the speed of the pump as a control variable.

In a preferred embodiment a limited control signal is provided as a first control signal when the operating limit is reached (or exceeded) which changes a speed of the pump and/or partially opens a control valve as a limited control variable. Only when the vibration rate of change limit and/or the vibration amplitude limit is reached (in particular after the operating limit has been reached), the control signal is provided as a second and final control signal to completely open the control valve and/or shut down/trip the pump.

Therefore, in a very preferred embodiment the operating limit can be used as a first trigger, and the first trigger in the surge control unit provides the first control signal when the operating parameter reaches the operating limit, wherein limit (within the scope of this application also the vibration rate of change limit) and/or vibration amplitude limit is used as a second trigger in the surge control unit after the first trigger provided the first control signal and the second trigger in the surge control unit provides a second or final control signal (i.e. the control signal), wherein limit and/or the vibration amplitude limit and the operating limit are thereby combined in a cascaded way as a trigger sequence.

A pump, in particular a multiphase pump, is furthermore proposed by an embodiment of the invention for conveying a fluid from a low-pressure side to a high-pressure side, having an inlet and an outlet for the fluid and having a surge control unit for avoiding the unstable operating state which provides the control signal for controlling the operation of the pump, wherein the limit for the rate of change of the vibration of the pump and/or the vibration amplitude limit for the vibration of the pump is present in the surge control unit, wherein the surge control unit can compare the current rate of change of the vibration during the operation of the pump with the limit and/or can compare the current vibration during the operation of the pump with the vibration amplitude limit, wherein a control signal is providable by the surge control unit when the current rate of change of the vibration reaches the limit or the current vibration reaches the vibration amplitude limit, said control signal being able to change the control variable of the pump, such that the vibration is reduced and thus an unstable operating state of the pump is avoidable.

The advantages and the preferred embodiments of the pump in this respect correspond to those which are explained above in connection with the operating method in accordance with the invention.

The pump can comprise the control valve in the return line for returning the fluid from the high-pressure side to the low-pressure side, wherein a position of the control valve in the return line is controlled as the control variable, and the position of the control valve can control the flow through the return line. The return line is therefore preferably connected to the high-pressure side to the low-pressure side, such that the fluid can be returned from the high-pressure side to the low-pressure side, when the control valve is in a suitable position.

The pump is preferably designed as a helico-axial or centrifugal pump and as pressure-elevating pump for oil production and gas production, in particular for sub-sea oil production and gas production.

An extremely reliable surge control for avoiding unstable operating states is possible by the operating method in accordance with embodiments of the invention or by the pump in accordance with embodiments of the invention.

Since the rate of change of the vibration and/or the vibration required for the control are available with a sufficiently high update rate (e.g. through fiber optics), very fast changes in the process conditions can also be recognized and responded to. It is specifically ensured by the use of the rate of change of the vibration of the pump in sub-sea applications that there are no signal delays which are caused, for example, by the components installed under water or by their connection to the components arranged above water. The advantage further results that the safety margin from the unstable operating states can be reduced or can be minimized so that the pump can be operated in a much larger operating range.

A further advantage of the method in accordance with embodiments of the invention and of the pump in accordance with embodiments of the invention is that they can also be retrofitted without problem into already existing pumps, i.e. that existing pumps can be modified into pumps in accordance with embodiments of the invention in a simple manner. For this purpose larger apparatus modifications are frequently not required.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION

Figure 1:
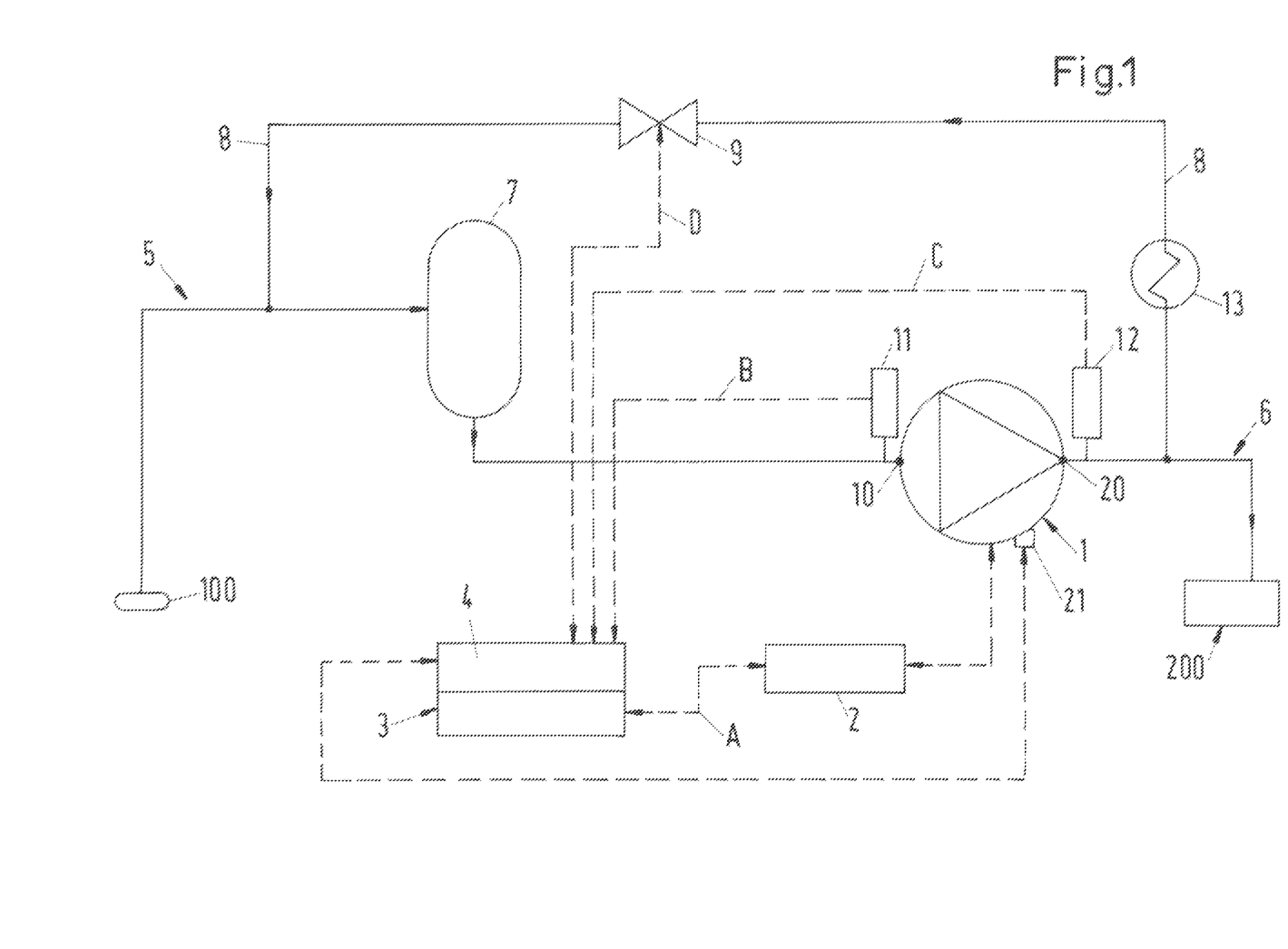
FIG. 1 is a schematic representation for illustrating an embodiment of the invention.

FIG. 1 illustrates in a schematic representation an embodiment of the invention in both an apparatus respect and a technical method respect. In the following, an embodiment of the operating method in accordance with the invention and an embodiment of a pump in accordance with the invention, which is designated as a whole by the reference numeral 1, will be explained with reference to FIG. 1. The pump is here configured as a multiphase pump. In this respect, reference is made with an exemplary character to the application important in practice that the multiphase pump 1 is configured as a centrifugal helico-axial pump and as a pressure-elevating pump which is also typically called a booster pump. In this application, the multiphase pump is used for oil and gas production and in particular for sub-sea oil and gas production in which the outlet of a borehole 100 is located on the seabed from where the petroleum and the natural gas are conveyed to a storage and processing apparatus 200 arranged above the ocean. The borehole 100 extends up to and into an oil field which is not shown in FIG. 1. In this respect, the storage and processing apparatus 200 can be installed on land or also in the offshore region, for example on a platform which is anchored on the seabed. The storage and processing apparatus 200 can naturally also be arranged floating on the ocean, for example in the form of an FPSO.

In this embodiment, the fluid to be conveyed by the multiphase pump 1 is therefore a multiphase fluid which comprises at least one gaseous phase and one liquid phase. It is the job of the multiphase pump 1 used as a booster pump in this respect to lower the pressure at the outlet of the borehole 100, for example to a value in the range from 10 bar to 40 bar, so that the fluid can exit the borehole 100 or so that the flow rate of the fluid conveyed from the borehole 100 is increased. This measure, which is known per se, is in particular advantageous as the degree of exhaustion of the oil field increases because the natural pressure prevailing in the oil field then decreases. The multiphase pump 1 can, for example, generate pressure differences of up to 150 bar, with the generated pressure difference naturally greatly depending on the actual density of the fluid and thus on its actual phase distribution.

Depending on the application, the multiphase pump 1 can be arranged on the seabed in the vicinity of the borehole 100 or at some distance therefrom or in the offshore region, that is, for example, on a (drill) platform or on an FPSO or also on land.

The invention is naturally not restricted to this specific application but is also suitable for all other applications in which multiphase pumps can be used or deployed. The invention is in particular suitable for multiphase pumps which are centrifugal pumps as well as helico-axial pumps and hybrid pumps (a combination of centrifugal and helico-axial hydraulics in a pump). The invention is also not restricted to multiphase pumps, but is rather generally suitable for pumps, that is also for single-phase pumps, in which the fluid to be conveyed only includes one phase, which is for example a liquid.

Lines through which the fluid can flow are shown by solid lines in FIG. 1, whereas signal connections are shown as dashed lines.

The multiphase pump 1 includes an inlet 10 through which the fluid enters into the multiphase pump 1 as well as an outlet 20 through which the conveyed fluid exits the multiphase pump 1. In the following, the region disposed upstream of the multiphase pump 1 is called the low-pressure side and the region disposed downstream is called the high-pressure side.

A first pressure sensor 11 with which that pressure at which the fluid flows into the multiphase pump 1 can be measured is disposed at the inlet 10 of the multiphase pump 1. A second pressure sensor 12 with which the pressure at which the fluid exits the multiphase pump 1 can be measured is disposed at the outlet 20 of the multiphase pump. The respective actual value of the pressure difference generated by the multiphase pump 1 can thus be determined from the difference signal of the two pressure sensors 11, 12. All pressure sensors known per se are suitable as pressure sensors 11, 12. The pressure sensors 11, 12 are preferably each arranged directly at the inlet 10 or at the outlet 20 of the multiphase pump 1.

The multiphase pump 1 is driven by a variable frequency drive 2 (VFD, or also a variable speed drive, VSD) which sets the shaft of the multiphase pump 1 into rotation together with the impeller or impellers (not shown) arranged thereon. The variable frequency drive 2 is in signal communication with a control device (controller) 3 for the control of the multiphase pump, as the double arrow A in FIG. 1 indicates, and can exchange data bi-directionally with the control device 3. The control device 3 is preferably configured as a digital control device 3.

The two pressure sensors 11 and 12 are each in signal communication with the control device 3, as the two arrows B and C in FIG. 1 indicate.

A surge control unit (surge controller) 4 is furthermore provided for preventing unstable operating states of the multiphase pump 1 and is preferably integrated into the control device 3. The terms "security against underflow" or "surge control" are also typically used for the surge control unit 4.

The inlet 10 of the multiphase pump 1 is connected at the low-pressure side to the borehole 100 via a supply line 5 through which the fluid can flow from the borehole 100 to the inlet 10. The outlet 20 of the multiphase pump 1 is connected at the high-pressure side to the storage and processing apparatus 200 via an outlet line 6 through which the fluid can flow from the multiphase pump 1 to the storage and processing apparatus 200. Depending on where the multiphase pump 1 is arranged in the respective case, the supply line 5 and the outlet line 6 can each have a length of less than one meter up to several kilometers.

A buffer tank 7 is preferably disposed in the supply line 5 which serves in a manner known per se to compensate variations in the phase distribution of the fluid. These variations can be caused by naturally instigated fluctuations of the gas-to-liquid ratio of the fluid exiting the borehole or also by the architecture and the line dynamics of the supply line 5. The buffer tank 7 acts as a filter or as an integrator and can thus absorb or damp abrupt changes in the phase distribution of the fluid.

A return line 8 for the fluid is furthermore provided which connects the high-pressure side to the low-pressure side. The return line 8 branches off from the outlet line 6 downstream of the outlet 20 of the multiphase pump 1 and opens upstream of the buffer tank 7 into the supply line 5 so that the fluid can be led back through the return line 8 from the high-pressure side to the low-pressure side. At least one control valve 9 is disposed in the return line 8 and is in signal communication with the surge control unit 4, as the arrow D in FIG. 1 indicates. The control valve 9 is designed as a regulation valve with which the flow cross-section of the return line 8 can be varied from the completely closed state (no return of fluid) up to the completely open state (maximum flow cross-section). The return line 8 serves for the surge control and thus for the avoidance of unstable operating states of the multiphase pump 1 which are also known as surging.

A vibration of the multiphase pump 1 can be measured by an appropriate vibration sensor 21, such as a housing acceleration sensor or shaft proximity probe. This vibration sensor is preferably located in the vicinity of a bearing of the pump, especially a bearing of a shaft of the pump. The vibration can be measured by an acceleration or a distance measurement at the bearing. In this way a rate of change of the vibration can be determined from the vibration measurement. The vibration sensor can be arranged at a suction side and/or discharge side of the pump 1 at a radial bearing. Preferably the vibration sensor is arranged at the suction side at a radial bearing of the pump 1.

If the flow through the multiphase pump 1 is large enough, the control valve 9 is completely closed so that no fluid can flow back through the return line 8 to the low-pressure side. If, as will be described further below, the exceeding of a limit for a rate of change and/or a vibration amplitude limit for a vibration or in particular the limit and/or the vibration amplitude limit and an operating limit for an operating parameter is detected by the surge control unit 4, due, for example, to too little fluid arriving at the inlet 10 (underflow region), then the surge control unit 4 controls the control valve 9 such that it opens the return line 8 partially or fully (control variable) so that a portion of the conveyed fluid can flow back from the high-pressure side to the low-pressure side. The control valve 9 is in this respect opened so wide until the current value of a rate of change of the vibration of the pump 1 lies below the limit or the vibration (the amplitude of the vibration) lies below a vibration amplitude limit and/or until the current value of the operating parameter lies below the operating limit.

The control valve 9 is preferably configured such that it can vary the open flow cross-section of the return line 8 continuously from the completely closed state up to the completely open state (control variable). It is naturally also possible to provide more than one control valves, for example, two control valves, in the return line 8 which are then arranged in parallel in the return line 8. Alternatively, two valves can also be arranged after one another, that is in series, in the return line 8, with one of the two valves then preferably being a fast Open/Closed valve and the other valve being a control valve which is configured as a regulation valve.

A cooling 13, for example a heat exchanger, can furthermore be disposed in the return line 8 to extract heat from the recirculated fluid. This measure is in particular advantageous when the fluid has a high gas portion. Heat build-ups can then be prevented by the cooling 13.

As already mentioned, the surge control unit 4 uses the current value of the rate of change of the vibration and/or the current value of the vibration and the current value of the operating parameter to avoid unstable operating states of the multiphase pump 1 or of the pump 1. As already explained, the term "operating parameter" means those parameters which can determine the operation of the pump 1 and which can be set by the control device 4 of the pump 1, that is, for example, a flow rate of the pump, a rotational speed of the multiphase pump 1, its power consumption, a torque at which the multiphase pump 1 is driven, and so on. Operating parameters are therefore those values which regulate the operation of the pump 1 or of the multiphase pump 1 and which can be set directly—or indirectly via a different operating parameter—at the pump 1 or at the multiphase pump 1.

The use of an operating parameter in combination with the rate of change of the vibration and/or with the vibration in particular has the advantage that those process values which cannot be determined or which can only be determined with a great effort or only very inaccurately, such as the actual phase distribution of the fluid, no longer have to be known for the surge control and furthermore an operational pump range can be enlarged.

In the embodiment described here, the relationship between the operating parameter and the pressure difference generated by the multiphase pump 1 is used in combination with the limit of the rate of change of the vibration and/or vibration amplitude limit for the surge control. The pressure difference can be determined by measurement very easily and very accurately by the two pressure sensors 11 and 12 during the operation of the multiphase pump 1.

Figure 2:
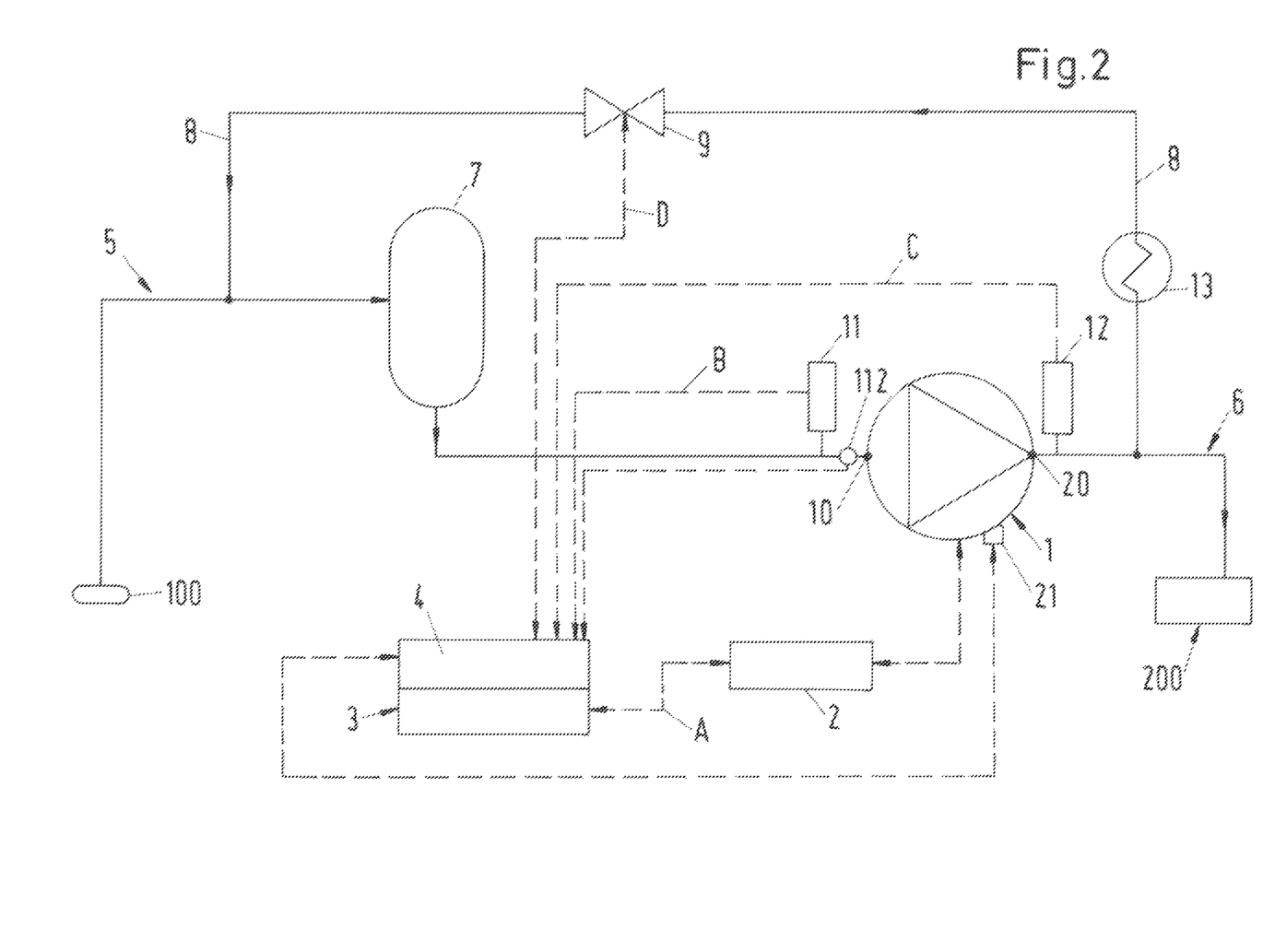
FIG. 2 is a second schematic representation for illustrating an embodiment of the invention.

FIG. 2 illustrates in a second schematic representation an embodiment of the invention in both an apparatus respect and a technical method respect. The structure of FIG. 2 corresponds to that of FIG. 1. In contrast to FIG. 1, however, a flow meter 112 is installed at the inlet 10 of the pump in FIG. 2. The flow meter 112 is in signal communication with the surge control unit 4 in which operating limit is stored.

The vibration sensor 21 is in signal communication with the surge control unit 4 in which the limit of the rate of change and/or the vibration amplitude limit of vibration is stored. The detected vibration is provided to the surge control unit 4 to determine the rate of change of the vibration.

Thereby, the vibration refers to an amplitude of the vibration and the rate of change of the vibration refers to a change of the amplitude of the vibration. In a normal operating state there are only little changes in the amplitude of the vibration. The limit is preferably a delta in the amplitude (i.e. the rate of change) of the vibration, whereas the vibration amplitude limit is a definable vibration amplitude itself (definable absolute value).

The limit and/or vibration amplitude limit is stored in a surge control unit 4, and a control signal is provided by the surge control unit 4 when the vibration current rate of change reaches the limit and/or the current vibration reaches the vibration amplitude limit. If there is a sudden increase in the amplitude, the vibration rate of change limit and/or the vibration amplitude limit may be exceeded, since a sudden increase in the amplitude will result in an increase in the rate of change of the amplitude.

A control variable of the pump 1 is changed by the control signal, such that the vibration is reduced and thus an unstable operating state of the pump is avoided. Thus, the control signal reduces the amplitude of the vibration in order to avoid the unstable operating state of the pump.

The vibration can for example be measured with an acceleration or a distance (proximity) sensor.

Preferably, the vibration rate of change limit and/or the vibration amplitude limit is combined with the operating limit to enlarge the operational range of the pump. The operating limit is then used as an indicator that the pump is about to enter the unstable operating state. Therefore, the pump can continue to be operated without triggering the control signal until the current rate of change of the vibration reaches the limit and/or the current vibration reaches the vibration amplitude limit.

Figure 3:
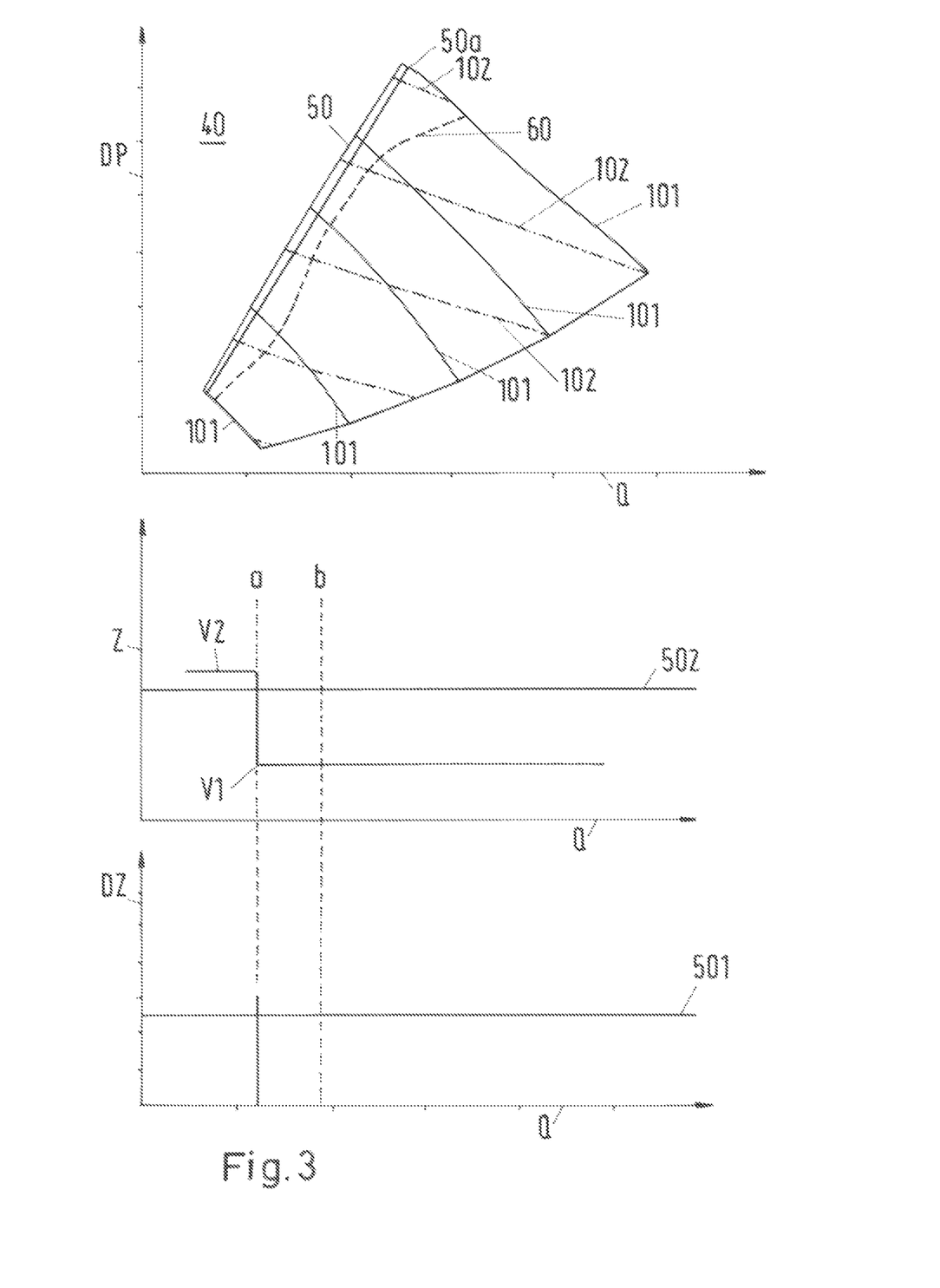
FIG. 3 is a representation of the relationship of the pressure difference generated by the embodiment of the multiphase pump with the flow rate and a representation of a vibration limit.

FIG. 3 shows, for a better understanding, a typical operating diagram of the multiphase pump 1 in which the relationship of the pressure difference generated by the multiphase pump 1 with the flow rate of the fluid conveyed by the multiphase pump 1 is shown. The flow rate Q is applied on the horizontal axis and the pressure difference DP on the vertical axis. With a multiphase fluid, this relationship naturally depends very much on the phase distribution of the conveyed fluid. This phase distribution of a fluid having a liquid phase and a gaseous phase is typically characterized by the GVF value (GVF: gas volume fraction) which indicates the ratio from the volume flow of the gas phase divided by the total volume flow (gas+liquid). The GVF value therefore lies between 0 and 1 or between 0 and 100%, where the value 0 means that only a liquid phase is present and the value 1 or 100% means that only a gaseous phase is present.

FIG. 3 shows the pressure difference DP in dependence on the flow rate Q for five different GVF values at a constant speed. The respective GVF value is constant on the iso-GVF curves designated by 101 and shown as solid lines. In this respect, the lowest iso-GVF curve 101, or the curve the furthest to the left according to the representation, corresponds to the largest GVF value. The higher or the further right in the diagram the iso-GVF curve 101 is, the smaller the associated GVF value is. In addition, iso-power curves 102 are also shown as chain-dotted lines in FIG. 3 on which the respective power consumed by the multiphase pump 1 is constant.

A lower surge limit line 50 is furthermore shown in FIG. 3 (by a solid line) which is typically also called a surge line. If this lower surge limit line 50 is exceeded so that the multiphase pump 1 moves in the region marked by 40 above the lower surge limit line 50, the multiphase pump 1 moves into an unstable operating state. It can easily be recognized with reference to FIG. 3 how changes in the actual phase distribution of the fluid can very abruptly result in the lower surge limit line 50 being exceeded and thus in unstable operating states. A change of the actual phase distribution corresponds, for example, to a jump from one iso-GVF curve 101 to another. The lower surge limit line is determined by model tests and is in reality not necessary a straight line in a chart DP vs. Q for a given speed.

In order to reliably avoid such unstable operating states in the region 40 during the operation of the multiphase pump 1, an operating limit 60 is fixed for the operating parameter and is spaced apart from the lower surge limit line 50, below the lower surge limit line 50 in the representation in accordance with FIG. 3. The operating limit 60 is shown as a dashed line in FIG. 3.

Furthermore, in FIG. 3 an operating diagram of the multiphase pump 1 in which the relationship of the vibration Z (i.e. the amplitude of the vibration) measured at the multiphase pump 1 with the flow rate Q of the fluid conveyed by the multiphase pump 1 is shown. The flow rate Q is applied on the horizontal axis and the vibration Z on the vertical axis.

In addition, in FIG. 3 operating diagrams of the multiphase pump 1 in which the relationship of the rate of change of the vibration DZ (i.e. the change of the amplitude of the vibration) and of the vibration Z with the flow rate Q of the fluid conveyed by the multiphase pump 1 are shown. The flow rate Q is applied on the horizontal axis and the rate of change of the vibration and the vibration on the vertical axis.

In a normal operating state there are only little changes in the amplitude of the vibration, i.e. the rate of change of the vibration is close to zero. When entering surge, there is typically a sudden increase in the vibration amplitude and therefore also a sudden increase in the rate of change of the amplitude. If there is a sudden increase in the amplitude (step function going from $V_1$ to $V_2$), the limit 501 may be exceeded, since a sudden increase in the amplitude will result in a sudden increase in the rate of change of the amplitude.

If the operating parameter reaches the operating limit 60 during the operation of the multiphase pump 1 and the rate of change DZ of the vibration reaches limit 501 and/or if the vibration (amplitude) reaches a vibration amplitude limit 502, the surge control unit 4 can control the control valve 9 such that the flow through the return line 8 is increased, and indeed so much until the current value of the operating parameter moves away from the lower surge limit line 50 and from the region 40 of unstable operating states and the vibration is reduced. Additionally, the control variable can be a speed of the pump which might be increased to avoid the unstable operating state. Furthermore, the control variable can be a switch to turn of the pump 1, such that the pump 1 is tripped when the limit 501 and/or the vibration amplitude limit 502 is reached or the limit 501 and/or the vibration amplitude limit 502 and the operating limit 60 is reached. In particular, the pump 1 can be tripped by the switch if the pump 1 is still surging after controlling the control valve 9 in the return line and/or the speed of the pump as a control variable.

To enlarge an operational range of the pump 1, the operating limit 60 and the limit 501 and/or the vibration amplitude limit 502 are staggered in a cascaded way. The operating limit 60 is used as an indicator that the pump 1 is about to enter the unstable operating state which is at a first flow rate b. Hence, the pump 1 can continue to be operated without triggering the control signal until the current rate of change of the vibration reaches the limit 501 and/or the current vibration reaches the vibration amplitude limit 502 at a second flow rate a. At the second flow rate a there is a sudden increase in the vibration from level $V_1$ to $V_2$ (i.e. a sudden increase in the rate of change of the vibration DZ), such that the rate of change of the vibration DZ reaches, in particular exceeds the limit 501 and the vibration reaches/exceeds the vibration amplitude limit 502. Only when the limit 501 and/or the vibration amplitude limit 502 is reached the control signal (to switch of the pump or completely open the control valve 9) is triggered.

Preferably a first control signal is provided when the operating limit 60 is reached. The first control signal opens valve 9 or increases a speed, such that the control action can now be extended all along limit 501 and/or vibration amplitude limit 502 is reached, giving more time to recover or extending operational envelope, since having limit 501 and/or vibration amplitude limit 502 allows to reduce a safety margin to line 50a (distance between line 50 and 60).

The limit 501 and/or the vibration amplitude limit 502 and the operating limit 60 are stored in the surge control unit 4, and the control signal is provided when a current value of the operating parameter reaches the operating limit 60 and the current rate of change reaches the vibration limit 501 and/or the current vibration reaches the vibration amplitude limit 502. The vibration limit 501 and/or the vibration amplitude limit 502 and the operating limit 60 are thereby combined in the cascaded way for example as a trigger sequence to enlarge the operational pump range.

Therefore, a first trigger i.e. the operating limit is telling the surge control unit if the pump is entering a low flow area of the operating state/is close to the unstable operating state. The first trigger provides the first control signal, which first control signal opens valve 9 or increases the speed, such that the control action can be extended until limit 501 and/or vibration amplitude limit 502 is reached, thereby giving more time to recover or extending operational envelope. A second trigger is defined by the rate of change of the vibration limit and/or vibration amplitude limit and the control signal starts as a second control signal if the first and second trigger are true (operating limit and rate of change of the vibration limit and/or vibration amplitude limit reached). The second control signal finally trips the pump or completely opens the control valve 9. Furthermore, the second trigger can comprise a timer such that the second control signal is provided when the current rate of change reaches and/or exceeds the limit 501 and the vibration stays at or above second vibration amplitude limit 502 for at least a predetermined period of time. In an advantageous embodiment the rate of change of the vibration and the vibration can first be determined after the operating limit 60 has been reached, to create the cascade to detect the unstable operating state.

Therefore, the first trigger preferably starts the first control signal which is a limited control signal which changes the speed of the pump and/or partially opens the control valve. Only the second trigger starts the second control signal which is a final control signal to completely open the control valve and/or shut down/trip the pump.

As a result of the combination of the operating limit 60 and the limit 501 and/or the vibration amplitude limit 502, the operational range of the pump 1 can be enlarged to 50a as shown in the operating diagram of the multiphase pump 1 in which the relationship of the pressure difference generated by the multiphase pump 1 with the flow rate of the fluid conveyed by the multiphase pump 1 is shown.

Figure 5:
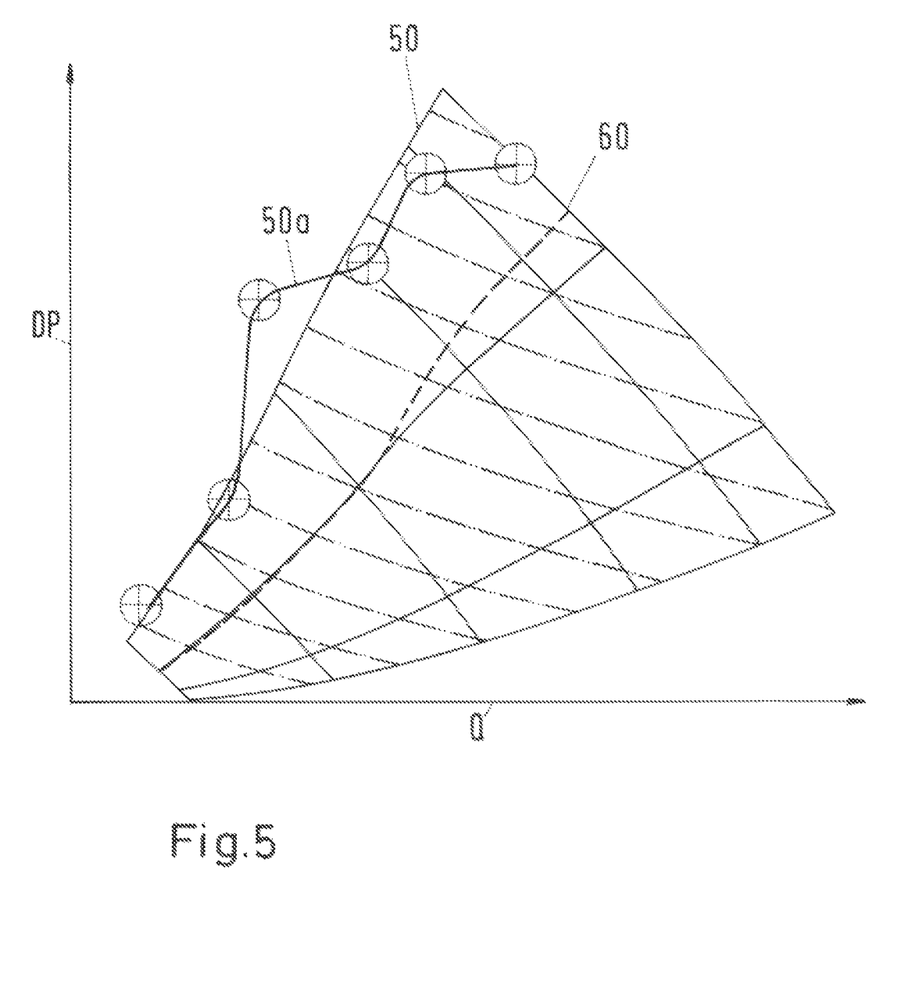
FIG. 5 is a realistic representation of DP vs. Q for a given speed.

This enlargement of operational envelope is illustrated even clearer in FIG. 5. FIG. 5 shows a realistic representation of DP vs. Q for a given speed. The second control signal switches off the pump, which is done at line 50a, and the first control signal is opening valve 9 or increasing the speed which is triggered first at operation limit 60. As a result the control action can now be extended until line 50a is reached giving more time to recover or extending operational envelope. The surge limit 50 shows only a theoretical limit, which has been calculated using various approximations. Line 50a allows to reduce the safety margin (distance between line 50 and 60), since the real (detected by vibration change or vibration) limitation 50a provides an accurate indicator of surging. Thus, the operational range can even be extended beyond the theoretical surge limit 50.

Predicting a real surge limit over the entire life of field with varying fluid viscosities and GVFs is a challenge as the methods rely on predefined surge curves from theoretical models or model tests, which can only represent limited data sets for practical and economic reasons. Measuring the required parameters in the field with sufficient accuracy and/or sampling time is another challenge. Therefore conservative control limits such as 60 are defined on top of the theoretical or experimental surge limits such as surge limit 50, accounting for uncertainty in the data and time constants in the control loop, but reducing the pump operational envelope.

Especially for viscous applications, there is some additional uncertainty related to the surge limit 50 as empirical data is limited. The conservative assumption is made that the surge limit for high viscous applications is at the same relative flow as in non-viscous (water) application. As in general the operating envelope in viscous duties is shifted towards lower flows, this means that the overall remaining envelope is further reduced for viscous duties (as the same non-viscous surge limit is assumed). This conservative approach is improved by using the limit 501 and/or the vibration amplitude limit 502, resulting in a larger operating envelope of the pump.

Using the vibration signal as trigger (direct measurement) in conjunction with traditional surge control or protection (indirect measurement), especially for subsea application, reduces the needed accuracy and control margins and expands the operational envelope as described above.

In this connection, it has proved to be particularly advantageous when the dependence of the operating parameter on the pressure difference is determined by the pressure difference which is actually generated by the multiphase pump 1. The operating limit or the lower surge limit line then indicates a unique relationship between the operating parameter and the pressure difference.

In principle, all operating parameters are suitable for the surge control. It has, however, proved to be advantageous for the operating parameter to be in a unique relationship with the torque at which the multiphase pump 1 is driven. The torque at which the multiphase pump 1 is driven is in particular preferably used as the operating parameter.

The torque is an operating parameter which is constantly available in operation and thus allows a very high update rate. The current value of the torque taken up by the multiphase pump 1 can be provided at any time by the variable frequency drive 2.

The pressure difference DP can be measured in a very simple and reliable manner by the two pressure sensors 11, 12 which transfer the pressure values measured by them via the signal connections B and C respectively to the surge control unit 4 which determines the current value of the pressure difference DP from it.

To determine a limit curve 60' (see FIG. 4) or a lower surge limit line 50' for the torque taken up by the multiphase pump 1, experimental data are preferably used which are determined on a test stand, for example, before the putting into operation of the multiphase pump 1.

Figure 4:
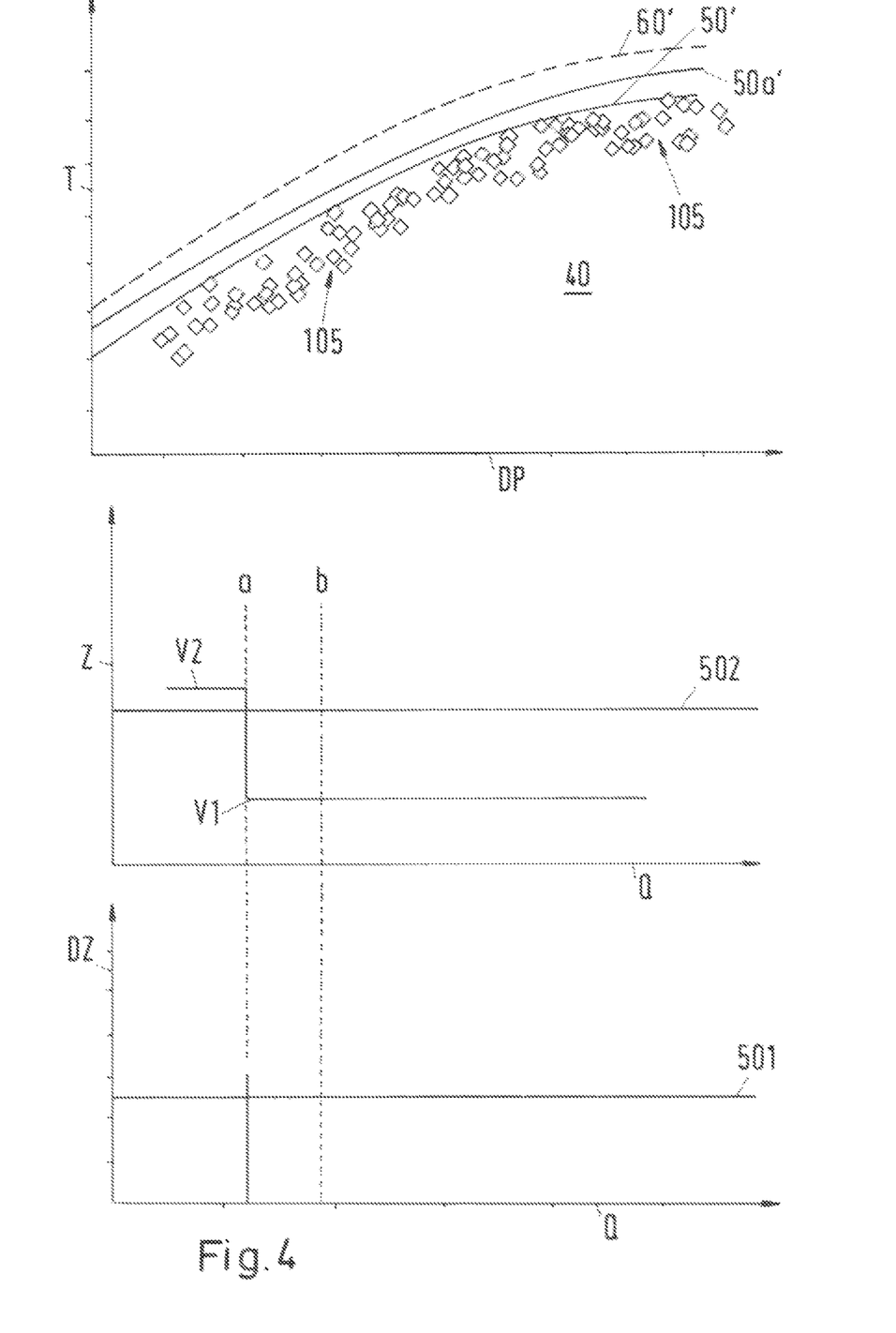
FIG. 4 is a representation of an operating limit and of a lower surge limit line in an application of the torque against the pressure difference and a representation of a vibration limit.

FIG. 4 shows a representation of the operating limit 60' and of the lower surge limit line 50' in an application of the torque against the pressure difference. The pressure difference DP is shown on the horizontal axis and the torque T taken up by the multiphase pump is shown on the vertical axis. The diamonds marked by 105 represent experimentally determined test data in which the multiphase pump runs in an unstable operating state. To determine these test data 105, the multiphase pump 1 is deliberately brought into an unstable operating state on a test stand, for example by varying the throughflow and/or by varying the phase distribution of the fluid. The latter is naturally possible in a test stand. In this respect, it is respectively determined at which values of the torque T and at which values of the pressure difference DP the multiphase pump 1 enters into the unstable operating state. These unstable operating states can be detected very simply, for example by the occurrence of strong vibrations, by an abrupt lowering of the conveying pressure at the outlet 20 of the multiphase pump 1 or by other changes. The test data 105 can be determined in this manner.

Subsequently, the lower surge limit line 50' is then fixed so that—in accordance with the representation in FIG. 4—all the test data 105 lie just below the lower surge limit line 50'. The operating limit 60' shown as a dashed line in FIG. 4 is then determined with a safety margin above, and preferably extending in parallel with, the lower surge limit line 50'. Selecting a margin between the lower surge limit line 50' and the operating limit 60' suitable for the application does not present any problems for the skilled person. It is now certain for the operation of the multiphase pump 1 that the multiphase pump 1 does not enter into an unstable operating state as long as it is operated above the operating limit 60' in accordance with the illustration (FIG. 4).

Alternatively or additionally, it is also possible to use empirical values for the determination of the operating limit 60' and/or the lower surge limit line 50' which were already determined by other pumps, for example, or which are known in a different manner. Calculated operating data or data gained by simulations can also alternatively or additionally be used for determining the lower surge limit line 50' or the operating limit 60'.

The operating limit 60' and the limit 501 and the vibration amplitude limit 502 can be stored in the surge control unit 4 for normal operation. This can be implemented, for example, in that the operating limit 60' and limit 501 and/or vibration amplitude limit 502 is stored as a look-up table or as an analytical parameterized function in the surge control unit 4. If the determined relationship between the operating parameter, here the torque T, and the pressure difference DP is particularly simple, for example linear, a corresponding function, for example a linear equation, can be stored in the surge control unit 4.

During the operation of the multiphase pump 1, the surge control unit 4 determines the respective current value of the pressure difference DP, which is just generated by the multiphase pump 1, by the signals of the pressure sensors 11, 12. Furthermore the current rate of change DZ of the vibration is determined from the vibration measurement.

As soon as the current value of the torque T for the current pressure difference DP reaches the operating limit 60' the surge control unit 4 provides the first control signal and controls the control valve 9 in the return line 8 such that the return line 8 thereby opens or opens wider. The return line 8 is opened further until the torque T again moves away from the operating limit 60' and from the lower surge limit line 50' and the vibration is reduced. Additionally, the control variable can be a speed of the pump which might be increased to avoid the unstable operating state. If the first control signal and the opening of the control valve or the adjustment of the speed as control variable is not enough the current value of the rate of change DZ of the vibration will reach the limit 501 and/or the current vibration will reach the vibration amplitude limit 502. Then the second control signal is provided to turn of the pump 1, such that the pump 1 is tripped when the limit 501 and/or the vibration amplitude limit 502 is reached. The pump 1 is tripped by the switch if the pump 1 is still surging after controlling the return line and/or the speed of the pump as a control variable.

It is hereby ensured that the multiphase pump 1 does not enter into the unstable operating state during normal operation. In this respect, the very high update rates are particularly advantageous at which the pressure difference DP and the current value of the operating parameter, here the torque T, can be determined.

The limit 501 and/or the vibration amplitude limit 502 and the operating limit 60' are preferably combined in the trigger sequence to enlarge the operational pump envelope. Therefore, the first trigger i.e. the operating limit 60' is telling the surge control unit 4 if the pump 1 is entering a low flow area of the operating state/is close to the unstable operating state. The second trigger is defined by the vibration limit 501 and/or the vibration limit 502. The first control signal starts if the first trigger is true and the second control signal starts if the first trigger and the second trigger are true (operating limit 60' and limit 501 and/or vibration amplitude limit 502 reached). The first control signal can for example control the control valve 9 in the return line 8. In an advantageous embodiment the rate of change of the vibration and/or the vibration is first determined after the operating limit 60' has been reached, to create the cascade to detect the unstable operating state, such that second control signal is provided when the limit 501 and/or the vibration amplitude limit 502 is reached.

After reaching the operating limit 60', pump 1 can therefore continue to be operated without triggering the (second) control signal until the current rate of change of the vibration reaches the limit 501 and/or the vibration reaches the vibration amplitude limit 502.

As a result of the combination of the operating limit 60' and the vibration limit 501 and/or the vibration amplitude limit 502, the operational range of the pump 1 can be enlarged to 50a' as shown in the operating diagram of the multiphase pump 1 in which the relationship of the pressure difference generated by the multiphase pump 1 with the torque taken up by the multiphase pump is shown.

It has been found that the fixing of the limit curve with reference to a correlation of the torque T which is taken up by the multiphase pump 1 with the pressure difference DP which is generated by the multiphase pump 1 results in a unique relationship for the respective hydraulic configuration which is otherwise independent of the current operating states of this multiphase pump 1 such as the current phase distribution in the multiphase fluid.

Although the invention has been described with reference to the embodiment of a multiphase pump 1, it is understood that the invention is not restricted to multiphase pumps, but rather also encompasses in the same sense single-phase pumps and pumps in general. In this respect, the pump can respectively be configured as a single-stage pump or as a multi-stage pump. The pump is preferably configured as a centrifugal pump or as a helico-axial pump.

In principle, it is also be possible to use a cascade of three triggers by combining the limit 501 and or the vibration amplitude limit 502, the operating limit 60 and the operating limit 60'.

Whether limit 501 and vibration amplitude limit 502 are used in combination or as alternatives may depend on the application or, for example on the sensor used. A housing sensor is preferably used with limit 501, since the absolute vibration values might be less accurate. In many applications, however, limit 501 and vibration amplitude limit 502 provide equivalent results, so they can also be used as a feedback control for each other.

In summary, the method according to embodiments of the invention is preferably carried out according to the following two scenarios. The "traditional" surge protection can be combined with the vibration measurement in a cascaded way, which allows for larger operational pump envelope. The lateral vibration signal of a pump obtained by accelerometers at the bearing housing/casing or from shaft proximity probes changes as a step function when entering surge (FIGS. 3 and 4). The method according to embodiments of the invention can be used as surge protection tripping the pump. The first trigger given by the operating limit is telling the surge control the pump is entering the low flow area of the operating envelope. The second trigger is defined by the rate of change of the vibration signal and/or the vibration signal and a timer, which would finally trip the pump and protect from surge if both triggers are true and timer has elapsed. The method according to embodiments of the invention can be used as surge control. The first trigger given by the operating limit initiates the surge control by opening the recirculation valve. This allows the flow eventually to recover. If opening the recirculation valve is not sufficient/flow did not recover, the second trigger is defined by the rate of change of the vibration signal and/or the vibration signal and a timer, which would finally trip the pump after the timer has elapsed.

What is claimed:

1. A method for operating a pump for conveying a fluid from a low-pressure side to a high-pressure side of the pump, a pump vibration changing with a rate of change, the method comprising: determining a current value of an operating parameter of the pump and comparing the current value of the operating parameter to an operating limit, the operating limit for the operating parameter being a limit below which the pump is capable of being reliably operated in a stable operating state and is stored in a surge controller;

providing a first control signal when a current value of the operating parameter reaches the operating limit;

changing a first control variable of the pump based on the first control signal;

determining a current rate of change of pump vibration and comparing the current rate of change with a limit for the rate of change, or determining a current vibration of the pump and comparing the current vibration with a vibration amplitude limit for the vibration;

storing the limit for the rate of change or the vibration amplitude limit in the surge controller;

providing a second control signal when the current rate of change reaches the limit for the rate of change or when the current vibration reaches the vibration amplitude limit; and changing a second control variable of the pump by the second control signal, only after changing the first control variable such that the vibration is reduced and an unstable operating state of the pump is avoided, and the operating limit being a first trigger, and the first trigger in the surge controller providing the first control signal when the operating parameter reaches the operating limit, the limit for the rate of change or vibration amplitude limit being a second trigger in the surge controller that is initiated after the first trigger has provided the first control signal and the second trigger in the surge controller provides the second control signal, the limit for the rate of change or the vibration amplitude limit and the operating limit thereby being combined in a cascaded manner as a trigger sequence.

2. The method according to claim 1, wherein the providing the second control signal includes providing the second control signal when the current rate of change reaches or exceeds the limit for the rate of change or the current vibration of the pump reaches or exceeds the vibration amplitude limit and a timer has elapsed at least a predetermined period of time.

3. The method according to claim 1, wherein the current rate of change of the pump vibration is a first current rate of change of the pump vibration in a predetermined spatial direction.

4. The method according to claim 1, wherein the pump vibration is a longitudinal or transverse pump vibration.

5. The method according to claim 1, wherein the operating limit indicates a unique relationship between the operating parameter and a pressure difference generated by the pump.

6. The method according to claim 5, wherein the pressure difference is detected by measuring a pressure at an inlet and a pressure at an outlet of the pump to compare the current value of the operating parameter with the operating limit.

7. The method according to claim 1, wherein the operating parameter is a torque with which the pump is driven.

8. The method in accordance with claim 1, wherein the current value of the operating parameter is provided by a variable frequency drive for the pump.

9. The method in accordance with claim 1, wherein the limit for the rate of change or the vibration amplitude limit or the operating limit is determined with experimental test data for the determination of when the pump is brought into the unstable operating state.

10. The method in accordance with claim 1, wherein the pump comprises a return line to return the fluid from the high-pressure side to the low-pressure side, and a position of a control valve in the return line is controlled as at least the first or second control variable, and the position of the control valve controls a flow through the return line.

11. The method in accordance with claim 1, wherein the pump is a booster pump in oil production and gas production.

12. The method for operating a pump according to claim 1, wherein the pump is a multiphase pump.

13. The method in accordance with claim 1, wherein the pump is a booster pump in sub-sea oil production and gas production.

14. A pump for conveying a fluid from a low-pressure side to a high-pressure side, the pump comprising: an inlet and an outlet for the fluid; and a surge controller configured to avoid an unstable operating state, wherein a limit for a rate of change of a vibration of the pump or a vibration amplitude limit for a vibration of the pump is stored in the surge controller, the surge controller configured to determine a current value of an operating parameter and compare the current value of the operating parameter to an operating limit, the operating limit for the operating parameter being a limit below which the pump is capable of being operated in a stable operating state and is stored in the surge controller, determine a current rate of change of pump vibration and a current vibration of the pump, compare the current rate of change of the vibration during the operation of the pump with the limit for the rate of change or the current pump vibration during the operation of the pump with the vibration amplitude limit, the surge controller configured to provide a first control signal when the operating parameter reaches the operating limit and provide a second control signal when the current rate of change reaches the limit for the rate of change or the current pump vibration reaches the vibration amplitude limit, the first control signal being capable of changing a first control variable of the pump and the second control signal being capable of changing a second control variable of the pump, only after changing the first control variable, such that an unstable operating state of the pump is avoided, and the operating limit being a first trigger, and the first trigger in the surge controller capable of providing the first control signal when the operating parameter reaches the operating limit, the limit for the rate of change or the vibration amplitude limit being a second trigger in the surge controller that is initiated after the first trigger has provided the first control signal and the second trigger in the surge controller capable of providing the second control signal, the limit for the rate of change or the vibration amplitude limit and the operating limit are thereby combinable in a cascaded manner as a trigger sequence.

15. The pump according to claim 14, further comprising a control valve in a return line configured to return the fluid from the high-pressure side to the low-pressure side, a position of the control valve in the return line is controlled as at least the first or second control variable, and the position of the control valve is capable of controlling flow through the return line.

16. The pump according to claim 14, wherein the pump is a subsea pump.

17. The pump according to claim 14, wherein the pump is a multiphase pump.

18. The pump according to claim 14, wherein the pump is a booster pump.

* * * * *